US012806601B2

(12) United States Patent
Breshike et al.

(10) Patent No.: US 12,806,601 B2
(45) Date of Patent: Nov. 24, 2026

(54) GRAFTING SORBENT MOIETIES INTO RIGID SCAFFOLDS

(71) Applicant: The Government of the United States of America, as represented by the Secretary of the Navy, Arlington, VA (US)

(72) Inventors: Christopher Breshike, Spotsylvania, VA (US); R. Andrew McGill, Lorton, VA (US); Courtney Roberts, Sherwood Forest, CA (US); Thomas Cao, Arlington, VA (US); Daniel A. Corbin, Arlington, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 501 days.

(21) Appl. No.: 18/241,559

(22) Filed: Sep. 1, 2023

(65) Prior Publication Data

US 2024/0075459 A1 Mar. 7, 2024

Related U.S. Application Data

(60) Provisional application No. 63/402,952, filed on Sep. 1, 2022.

(51) Int. Cl.
*B01J 20/32* (2006.01)
*B01J 20/22* (2006.01)

(52) U.S. Cl.
CPC ......... *B01J 20/3278* (2013.01); *B01J 20/226* (2013.01)

(58) Field of Classification Search
CPC ............................ B01J 20/226; B01J 20/3278
See application file for complete search history.

(56) References Cited

U.S. PATENT DOCUMENTS 10,287,304 B2 5/2019 Yaghi et al.
2014/0294709 A1* 10/2014 Long ...................... B01D 53/62 548/101
2017/0081346 A1 3/2017 Yaghi et al.
(Continued)

FOREIGN PATENT DOCUMENTS

CN 112898585 A * 6/2021 ........... C07C 51/487
CN 113736095 12/2021
(Continued)

OTHER PUBLICATIONS

Machine translation of Du et al (CN 114736895). (Year: 2022).*
(Continued)

*Primary Examiner* — Brian A McCaig
(74) *Attorney, Agent, or Firm* — US Naval Research Laboratory; Stephen T. Hunnius

(57) ABSTRACT

The present invention provides a method of making an adsorbent material for protection and sensing applications from gas and liquid phase media by grafting sorbent moieties onto a rigid scaffold. The grafting can be to an organic linker of a metal organic framework by post synthetic modification, to the metal nodes of the metal organic framework via ligand displacement, or by intercalating the sorbent moiety into the pores of the metal organic framework either during formation of the scaffold or by diffusion into the pores after the scaffold is formed.

16 Claims, 8 Drawing Sheets

(56) References Cited

U.S. PATENT DOCUMENTS

| | | | | |
|---|---|---|---|---|
| 2018/0306740 | A1 | 10/2018 | Mirica et al. | |
| 2020/0274080 | A1* | 8/2020 | Britt | H10K 85/346 |
| 2021/0069672 | A1 | 3/2021 | Abtab et al. | |

FOREIGN PATENT DOCUMENTS

| | | | | | |
|---|---|---|---|---|---|
| CN | 114736895 | A | * | 7/2022 | C12Y 111/01006 |
| EP | 3335788 | A1 | * | 6/2018 | B01J 20/3085 |

OTHER PUBLICATIONS

Machine translation of Xie et al (CN 112898585). (Year: 2021).*

Servalli, M. et al., 2012, Chemical Communications, 48, 1904-1906. (Year: 2012).*

Li, T. et al., 2013, Journal of the American Chemical Society, 135, 11688-11691. <dx.doi.org/10.1021/ja403810k> (Year: 2013).*

Al-Naddaf, Q., 2018, Industrial and Engineering Chemistry Research, 57, 17470-17479. (Year: 2018).*

Zou, D., et al., 2019, Materials Today Chemistry, 12, 139-165. <https://doi.org/10.1016/j.mtchem.2018.12.004> (Year: 2019).*

* cited by examiner

Computational screening of sorbent moieties (SMs)

| APOHO distance | | | |
|---|---|---|---|
| position | $CH_3$ | $CF_3$ | F |
| ortho[anti] | -0.001 | -0.060 | -0.021 |
| ortho[syn] | 0.053 | -0.027 | -0.023 |
| meta[anti] | 0.003 | -0.023 | -0.016 |
| meta[syn] | 0.004 | -0.038 | -0.021 |
| para | 0.005 | -0.031 | -0.005 |
| ortho,di | 0.023 | -0.090 | -0.052 |

GRAFTING SORBENT MOIETIES INTO RIGID SCAFFOLDS

PRIORITY CLAIM

The present application is a non-provisional application claiming the benefit of U.S. Provisional Application No. 63/402,952, filed on Sep. 1, 2022 by Christopher Breshike et al., entitled "GRAFTING SORBENT MOIETIES INTO RIGID MICROPOROUS SCAFFOLDS." This application and all other publications and patent documents referred to throughout this nonprovisional application are incorporated herein by reference in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case No. 211213-US2.

BACKGROUND OF THE INVENTION

Field of the Invention

The invention relates to the field of grafting sorbent moieties onto a rigid scaffold.

Description of the Prior Art

Military personnel and first responders are often at heightened risk of exposure to hazardous chemicals (e.g. explosives, aerosolized opioids, and particle matter). To protect against such exposures, advanced absorbent materials are needed to either remove the hazardous materials from air or water or to trap chemicals for subsequent or in situ analysis/detection. Current collection/protection materials utilized in HVAC systems or gas masks are based on World War I activated carbon with some additives for improved but not targeted performance. Some desired efficiency and performance gains over existing adsorbent technologies include:

- robust materials with unique infrared (IR) signatures in the near and mid-wave IR spectra regions for discrete monitoring interests;
- improved retention of high vapor pressure explosives relative to background chemistries, up to $10^6$ additional selectivity over simple hydrocarbon and other background chemicals;
- reduced chemical breakthrough through an adsorbent bed by improving adsorbate capacity, up to 10-fold over native adsorbent materials;
- allowance for adsorbent purging without decomposition via thermal cycling for reuse, which currently presents a challenge for carbonaceous materials in common use,
- reduced joule energy or air flow resistance required to effectively pass airflow or liquid water through an adsorbent, with a corresponding doubling in mass transfer effectiveness for the same joule energy consumed; and
- opportunities for in-situ detection when chemistries of interest are trapped.

Successful gains in these areas would provide a clear path to provide new materials to improve the warfighter's ability to track assets, tag enemy platforms, provide protection against exposure to hazardous chemicals or materials, and allow in-situ sensing modalities. The surface of the porous materials can be optically probed with IR light, allowing selective in-situ spectroscopic detection. This offers the potential for relatively simple detection architectures. In addition, for complex mixtures, preconcentrator collection devices can be packed with smart adsorbents, and used in a repeated cycle. Collected chemicals can be rapidly released, during thermal desorption, into a transducer or gas chromatographic column to augment chemical detector performance.

Previous work done at the Naval Research Laboratory has resulted in a series of materials that were patented based on the structure shown in FIG. 1A (U.S. Pat. No. 11,654,415, 2023 May 23; U.S. Pat. No. 11,648,529, 2023 May 16; and U.S. Pat. No. 11,325,100, 2022 May 10). These bisphenols act as adsorbents to trap hydrogen-bond-basic species through the OH groups on either phenol group. The electron withdrawing groups ($CF_3$) change the acidity of the OH group to form hydrogen bonds with more basic oxygens that are present in chemicals such as organophosphates. The graph in FIG. 1B exhibits a broadening of the signature OH stretch caused by self-interactions. The bottom curve (oapBPAF) has R and R' groups that protect the OH from self-interactions, while the middle (o1pBPAF) and top (o1pBPA) curves are bisphenols that do not. The tradeoff for these protections and sharpening of the OH stretch signal is a decrease binding strength to potential threat analytes. O1pBPA and o1pBPAF exhibit an order of magnitude higher binding coefficient for DMMP than oapBPAF. In one embodiment of the present invention, the OH groups are isolated from each other rather than using sterics to protect them from interacting with one another. This strategy should result in sharp OH stretches like the bottom curve in FIG. 1B while maintaining high specific binding for analytes of interest like those species represented in the top and middle curves. Along with problems with self-interactions, the previous generation of sorbents are typically oils or viscous liquids that are not conducive to collection/protection applications.

SUMMARY OF THE INVENTION

The purpose of the present invention is to provide adsorbents for rapid uptake of and high affinity for hazardous chemicals in contaminated air or water. The adsorbent materials offer several functional advantages, including targeted adsorption, high capacity, and reusability through a rapid thermal release, without sorbent degradation. These materials also address an issue of self-binding by isolating the self-interacting groups from each other. The disclosed invention establishes the fundamental materials science driving IR spectral signatures and adsorbent performance to produce a new material class intended for sensing applications and robust adsorbent applications from gas and liquid phase media. The custom developed porous materials are designed to generate unique IR spectral features for sensing, targeted chemical trapping, and reusability.

The present invention provides a method of making an adsorbent material for sensing applications from gas and liquid phase media by grafting sorbent moieties onto a rigid scaffold. The grafting can be to an organic linker of a metal organic framework by post synthetic modification, to the metal nodes of the metal organic framework via ligand displacement, or by intercalating the sorbent moiety into the pores of the metal organic framework either during formation of the scaffold or by diffusion into the pores after the scaffold is formed.

These and other features and advantages of the invention, as well as the invention itself, will become better understood by reference to the following detailed description, appended claims, and accompanying drawings.

DETAILED DESCRIPTION OF THE INVENTION

Figure 1B:
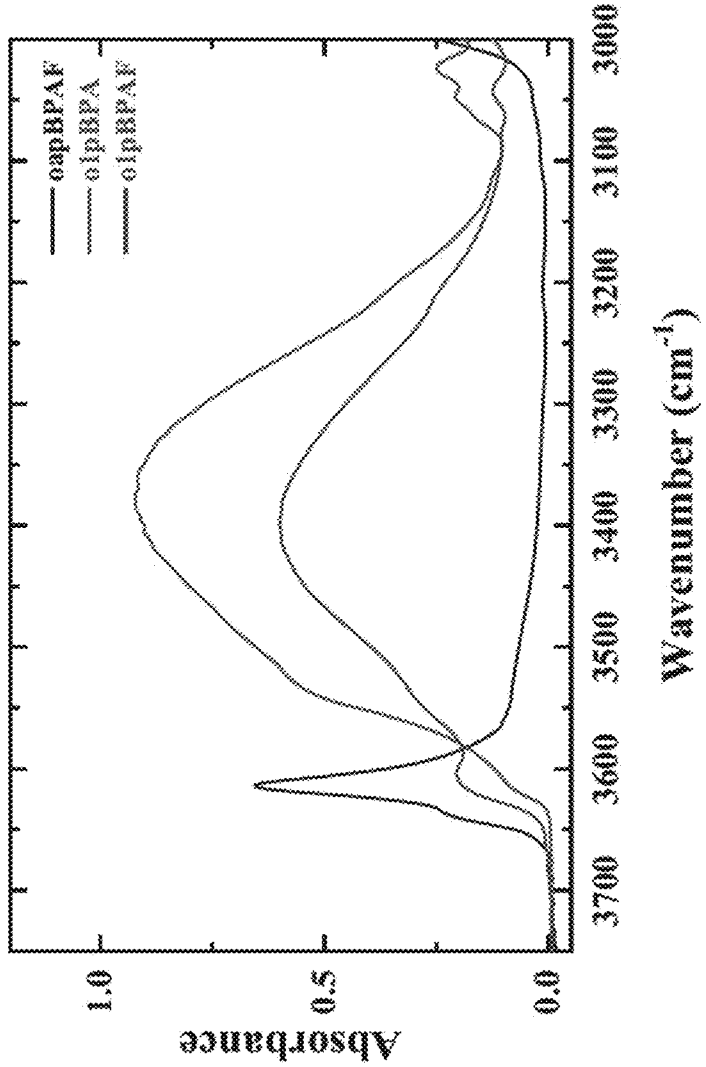
FIG. 1B shows the midwave Fourier-transform infrared (FTIR) spectroscopy of three examples of bisphenol sorbents with oapBPAF (bottom line) having R and $R^1$ groups that protect the OH from self-interactions, while o1pBPA (top line) and o1pBPAF (middle line) are not protected and exhibit a broad OH stretch due to these self-interactions.
Figure 1A:
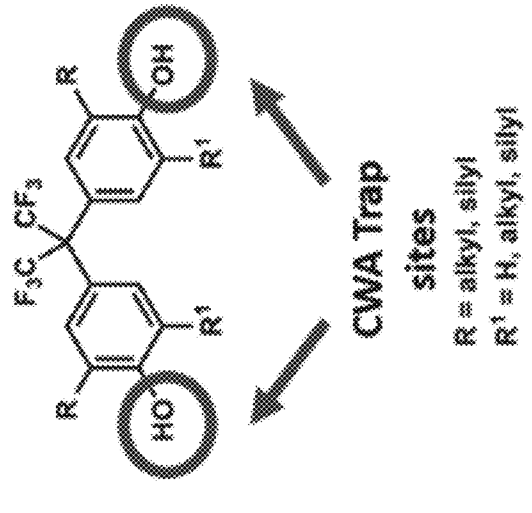
FIG. 1A is a basic structure of a bisphenol sorbent. The OH groups on either phenol form hydrogen bonds with hydrogen-bond-basic species that could be harmful to personnel.
Figures 2A, 2B:
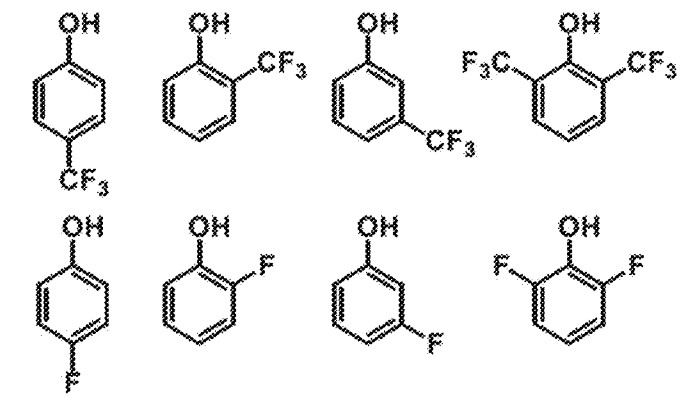
FIG. 2A shows examples of fluorinated phenols to act as the sorbent moieties.
FIG. 2B shows the calculated change in hydrogen bond length between the oxygen on DMMP and hydrogen on the OH of the phenol. A more negative change in this hydrogen bond length indicates a higher affinity for the analyte.

The present invention is for the grafting of sorbent moieties onto a rigid scaffold for the purpose of increasing mass flow transportation of analytes to binding sites of the sorbent system (scaffold plus moieties) while maintaining selectivity for hazardous chemistries such as organophosphates. The typical sorbent moiety is phenol-based with electron withdrawing or donating group where appropriate to change the hydrogen bonding behavior of the OH group on the phenol. A few example moieties are shown in FIG. 2A.

The fluorinated groups around the phenol ring increase the acidity of the OH group to varying degrees, which translates to the selectivity for hydrogen-bond-basic analytes such as organophosphates. FIG. 2B shows the calculated change in hydrogen bond length between the oxygen on dimethyl methylphosphonate (DMMP) and the hydrogen on the OH of the phenyl compound. A more negative change in this hydrogen bond length corresponds to a stronger interaction and therefore more selectivity for the organophosphate.

There are three main methods of modifying a scaffold structure with the sorbent moieties:

- grafting to the organic linker of a metal organic framework (MOF) by post synthetic modification;
- grafting to the metal nodes of the MOF via ligand displacement; and
- Intercalating into the pores of the MOF, either during formation of the scaffold or by diffusion into the pores after the scaffold is formed.

Grafting to Linker

Figure 3:
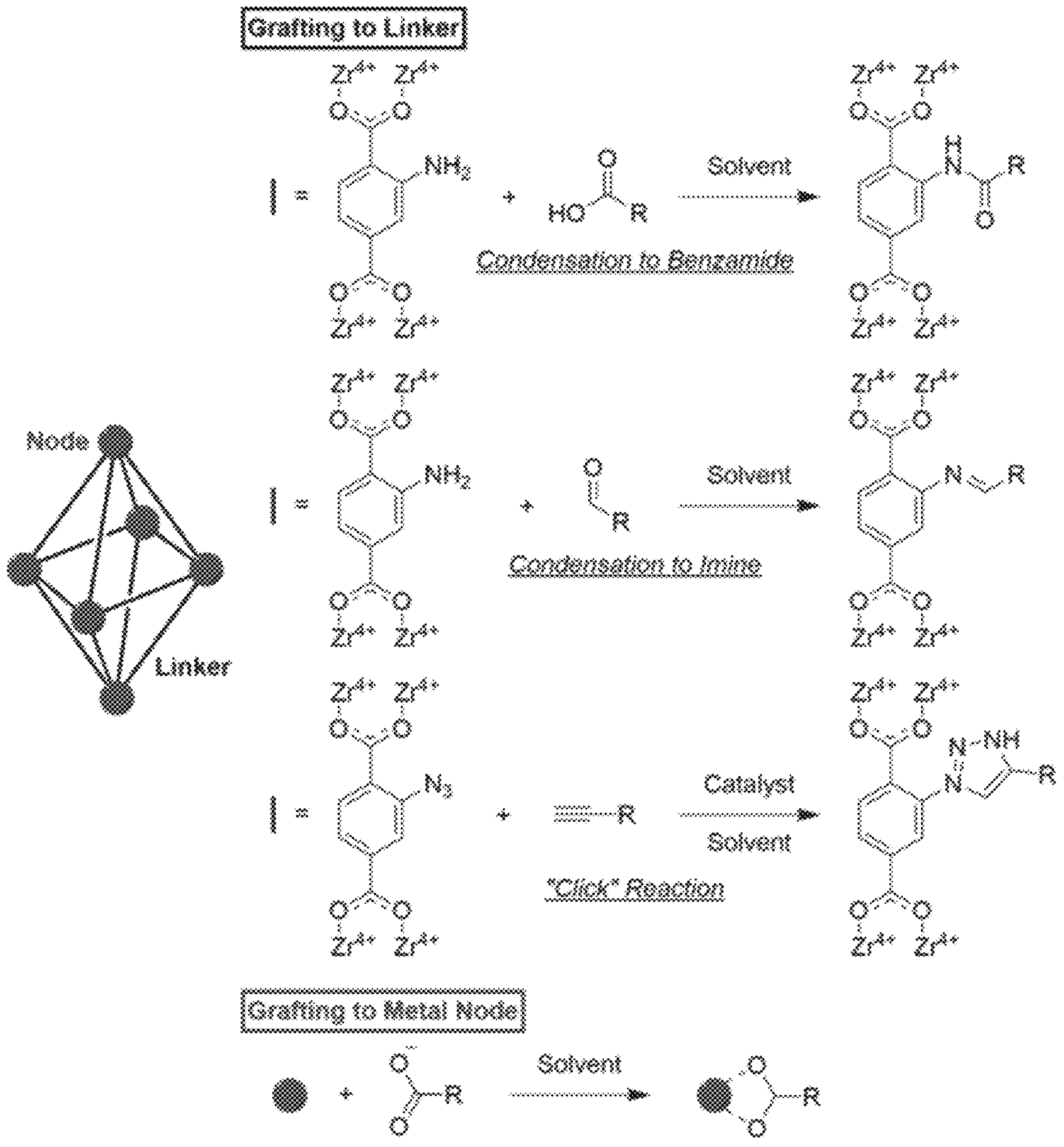
FIG. 3 shows schemes of different grafting approaches for incorporating sorbent moieties into MOFs.

There are a number of paths that all lead to the same end result of a sorbent moiety grafted onto the organic linker of the MOF. Several MOFs have already been shown to be conducive to post synthetic modification, including UiO-66 variants and especially UiO-66-$NH_2$. A few examples of grafting to the organic linker include performing click chemistry between an alkyne and a triazole after converting the $NH_2$ of UiO-66-$NH_2$ into an $N_3$ group; the formation of a benzamide by reaction of a carboxylic acid and an amine; or the formation of an imine bond through the condensation reaction of an aldehyde and an amine. FIG. 3 illustrates three examples of pathways for grafting to the linker of the MOF scaffold.

Grafting to Metal Node Via Ligand Exchange

The organic linkers coordinating to the metal node in a MOF scaffold have been shown to reach some equilibrium that falls short of 100% of the possible sites being occupied. For example, UiO-66 has been shown to have on average 5.4 linkers per node where the maximum possible linkers if 6. This equilibrium process of the organic linkers dissociating and coordinating back with the metal node can be taken advantage of by introducing another coordination complex that would replace the linker. This could be done at a low enough level that the overall structure of the scaffold would not be affected in a meaningful way but the substituted moieties for the organic linker could increase the affinity for analytes of interest such as organophosphates. The nature of the coordination will be dependent on the metal node in the scaffold, for instance zirconium nodes coordinate with carboxylic acids while gold nodes would prefer thiols. This coordination should leverage Ligand Field Theory to match the best ligand coordination groups with the metal node of the scaffold of interest. The bottom of FIG. 3 illustrates the coordination of a sorbent moiety "R" to the metal node of a MOF represented by a ball.

Intercalation of Moieties into the Pores of the Scaffold

Figure 4:
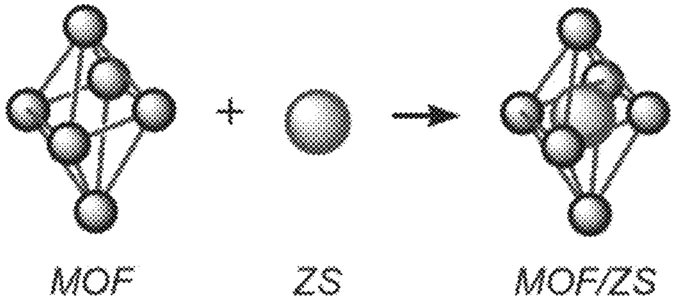
FIG. 4 is a representation of intercalation of sorbent moieties into the pores of the MOF scaffold.

Intercalation into a scaffold represent a path of functionalization of the scaffold that results in no covalent bonds between the moiety and the scaffold. FIG. 4 illustrate the concept as a molecule, represented as a ball, sits inside the pore of a MOF without being chemically bonded to any part of the scaffold. This can be accomplished two ways:

- Diffusion into the scaffold. Diffusing into the scaffold should be considered a form of "post synthetic modification" in that the scaffold is formed and then introduced to a solution of the moiety that makes its way into the pores of the scaffold via simple diffusion or by some force exerted on the system that would push the moiety into the pores. This method does not require the moiety to share solubility with the scaffold precursors.

Formation of the scaffold around the moieties. Formation of the scaffold around the moiety involves the scaffold being formed in the presence of a high concentration of the moiety. This forces the scaffold to form around the moiety. This requires the moiety to be encapsulated to share solubility with the scaffold precursors.

Both of these examples result in the capture of the moiety inside of the pores of the scaffold in such a way that after washing and drying the materials they cannot easily escape the pores.

Zincke Salt

Figure 5A:
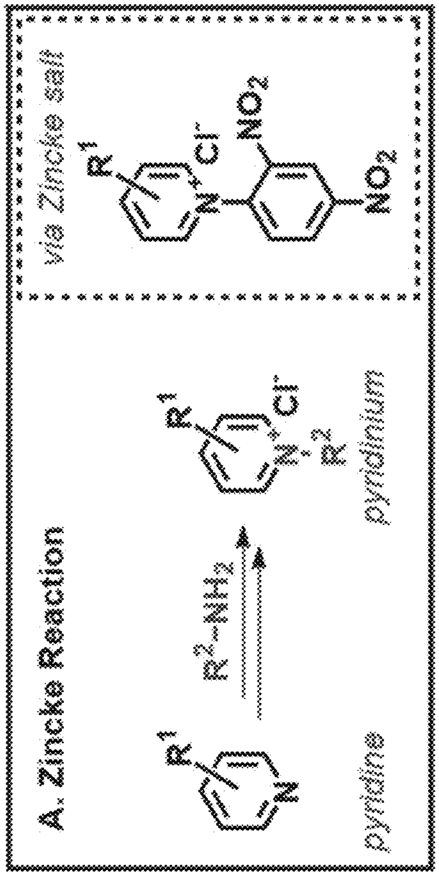
FIG. 5A shows the Zincke reaction.
Figure 5B:
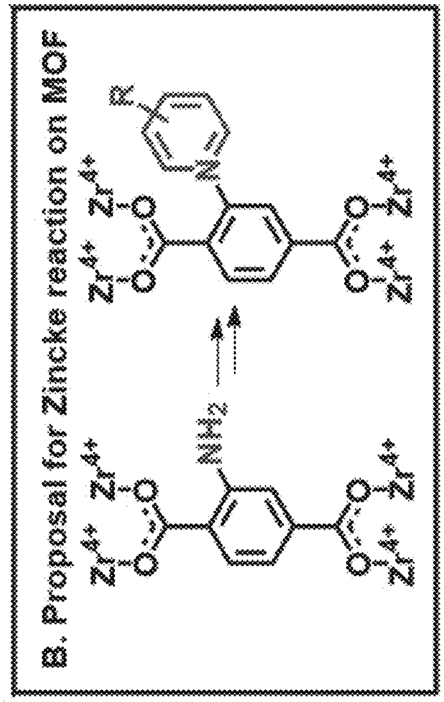
FIG. 5B shows the proposed Zincke reaction on UiO-66-$NH_2$.

It was attempted to replace the amino ($NH_2$) group on UiO-66-$NH_2$ with a pyridinium via the Zincke reaction (FIG. 5A). This is a potential post-synthetic modification (FIG. 5B) that, it is believed, has not been reported in the literature thus far. Instead of proceeding with the Zincke reaction, it was found that the Zincke salt (ZS) forms stable adducts to UiO-66-$NH_2$ resulting in a new material that releases both BDC-$NH_2$ and ZS when digested. More intriguingly, the new material (denoted UiO-66-$NH_2$/ZS) is endowed with new spectral features belonging to the functional groups on ZS—spectral features that are not seen in either the free ZS or the pristine UiO-66-$NH_2$.

Figure 6:
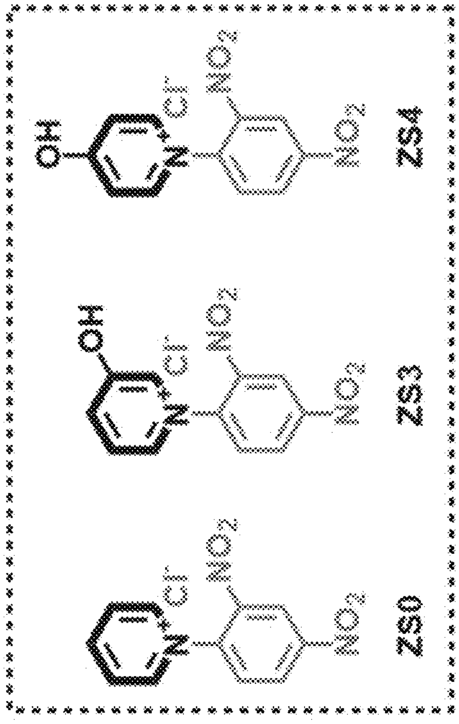
FIG. 6 shows structures of Zincke salts.

Three Zincke salts were synthesized with the structures shown in FIG. 6. The compound denoted ZS3 and ZS4 showed conversion efficiencies (ratio of BDC-$NH_2$:ZS) of about 1:0.3 after digestion, indicating a high loading of substrate that can manifest changes in material properties on TGA and IR. In the solid state, free ZS3 and ZS4 exhibit broad uptake in the MOF, these modes disappear, and a new, sharp peak appears in the region associated with non-self-associating OH groups at a wavenumber consistent with that calculated for an isolated ZS molecule.

Advantages

Figure 7:
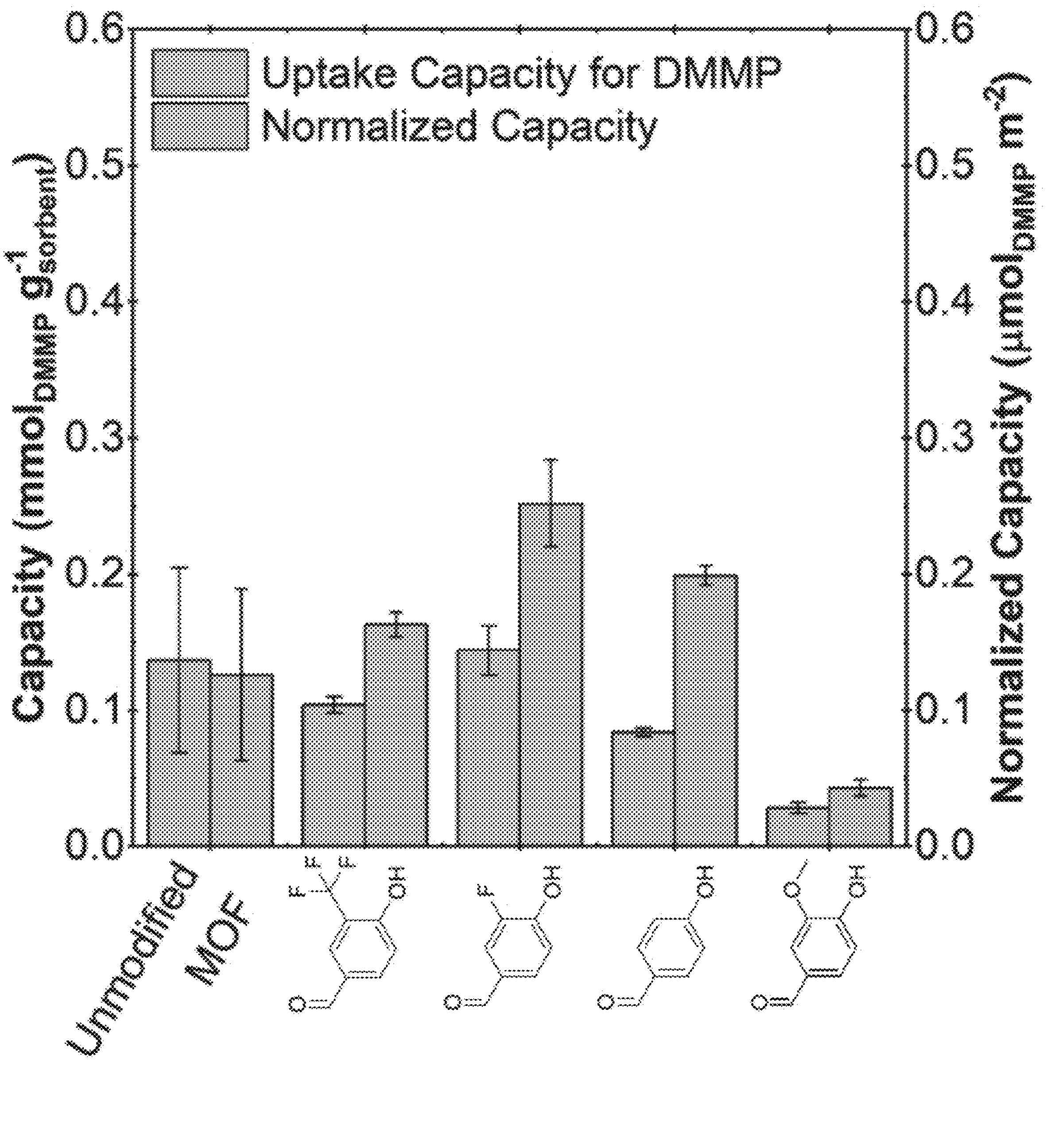
FIG. 7 shows data from imine functionalized MOFs illustrating as the electron withdrawing group gets closer to the OH group, there is a higher uptake capacity for DMMP relative to surface area. There is an outlier with the trifluorinated methyl species that is believed to be caused by steric blocking of the analyte from the OH group.

The present invention offers higher surface area than the previous bisphenol sorbents allowing for faster uptake of analytes of interest. Functionalized MOFs with the sorbent moieties grafted in exhibit lower surface areas than the native MOFs but are still comparable to activated carbon that is used in filter systems today. FIG. 7 compares the DMMP uptake of select functionalized MOFs with the unfunctionalized UiO-66-$NH_2$. The reduced surface areas of the functionalized MOFs result in a decrease in their overall capacities (left bars) due to less free volume in the functionalized materials. While this effect is significant and should be addressed in future material designs, it convolutes the analysis of how these added functionalities impact sorbent performance. However, normalizing the data to the surface area of each material (right bars) allows for this effect to be removed such that underlying trends can be investigated. As a result, an expected trend emerges in which electron-withdrawing groups increase the normalized capacity of the functionalized MOFs. One notable outlier if the ortho-$CF_3$ group, which may sterically hinder access of the analyte to the OH group, thus reducing the efficacy of this functionality.

Figure 8:
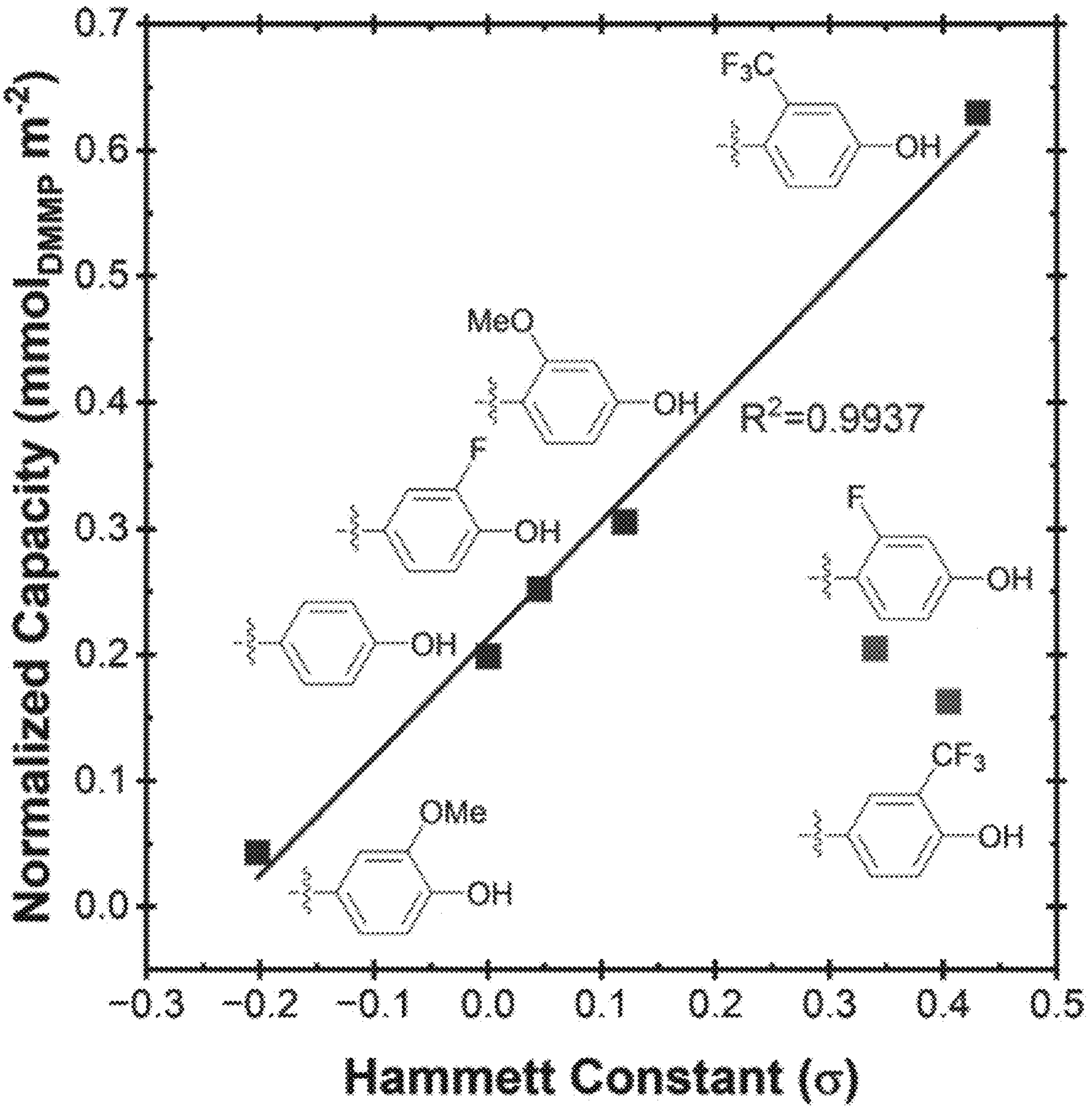
FIG. 8 is a graph showing the correlation of Hammett substituent constants and normalized uptake capacity for select imine functionalized MOFs. A trend emerges highlighting a possible positive effect of electron-withdrawing groups on sorbent performance.

A more direct comparison of sorbent performance based on the identity of the added functional groups can be obtained using Hammett substituent constants. Hammett constants can be used to quantify the electron-donating or -withdrawing nature of different functional groups due to inductive, resonance, and positional effects. FIG. 8 shows the application of this analysis to the Imine series of functionalized MOFs, in which a positive correlation is observed. This positive correlation supports the previous observations that electron-withdrawing groups have a positive impact on sorbent performance, while also highlighting the effect of functional group position. Notably, one of the two outliers in this tread it the ortho-$CF_3$ functionalized MOF, which as previously mentioned may exhibit interfering steric effects that are not accounted for in the Hammett substituent constants.

Figure 9A:
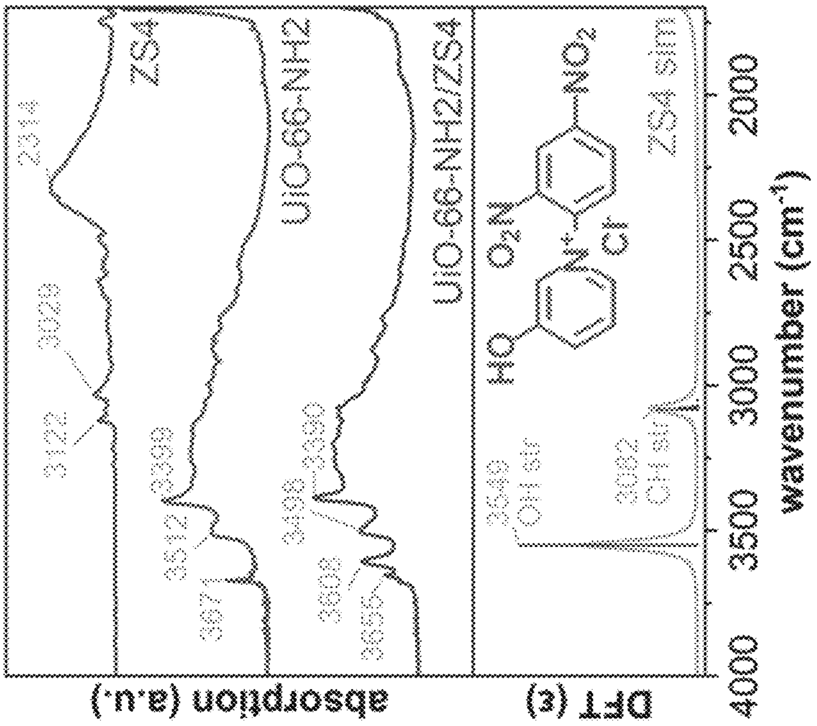
FIGS. 9A and 9B show ATR FTIR spectra of ZS4 and ZS3, respectively, compared to the native spectra of UiO-66-$NH_2$ and the functionalized MOF containing each ZS. The functionalized MOF each exhibit a new spectral peak that matches the density functional theory calculated position of a "free OH" group stretching.
Figure 9B:
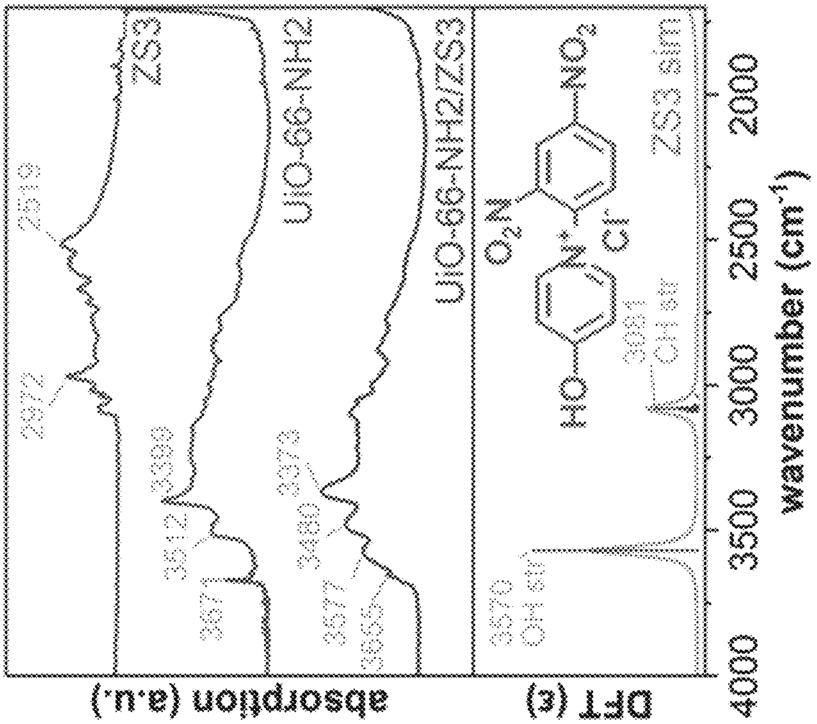

The isolation of the individual sorbent moieties either by grafting or by intercalation narrows the OH vibrational stretch, offering a mode to sense the capture of hydrogen bond basic species, such as organophosphates, while maintaining the high selectivity for those species. FIGS. 9A and 9B illustrate the effect of isolating the sorbent molecules from each other on their FTIR spectra. In this case, a Zincke salt, the bare MOF (UiO-66-$NH_2$), and a MOF supported ZS are compared, showing a loss of modes in the 1800-2400 $cm^{-1}$ range and the appearance of a mode in the range associated with a discrete (i.e., not self-associating) OH stretch. This new mode is sharp and in close agreement with the DFT predicted peaks of an isolated ZS molecule in a vacuum shown in the bottom of FIGS. 9A and 9B.

Alternatives

Possible alternatives include different MOF scaffolds. This work was focused on UiO-66 derivatives, but any stable MOF that has the functional groups needed for post synthetic modification would be appropriate for grafting, including but not limited to UiO-67 and UiO-68 derivatives. Other possible scaffolds include hydrogels, boron nitrides, and porous silica. Different scaffolds may also offer cleaner FTIR spectra for sensing applications. FIG. 9 shows the emergence of a new peak that is believed to be indicative of a free OH stretch, but this region also has distinct vibrational modes that are native to the scaffold that may interfere with the OH stretch after it shifts from forming a hydrogen bond with a hydrogen bonding basic analyte like DMMP.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letter Patent of the United States is:

1. A method of making an adsorbent material generating unique IR spectral features for sensing applications from gas and liquid phase media, comprising providing a metal organic framework;

grafting a sorbent moiety to an organic linker of the metal organic framework by post synthetic modification wherein the post synthetic modification comprises performing click chemistry between an alkyne and a triazole; and producing an adsorbent material generating unique IR spectral features for sensing applications from gas and liquid phase media.

2. The method of claim 1, wherein the post synthetic modification comprises forming an imine bond through a condensation reaction of an aldehyde and an amine.

3. The method of claim 1, wherein the sorbent moiety is phenol based.

4. The method of claim 1, wherein the sorbent moiety is a fluorinated phenol or bisphenol.

5. The method of claim 1, wherein the metal organic framework comprises Ui0-66 or a derivative thereof.

6. The method of claim 5, wherein the metal organic framework comprises Ui0-67, Ui0-68, or any derivatives thereof.

7. A method of making an adsorbent material generating unique IR spectral features for sensing applications from gas and liquid phase media, comprising providing a metal organic framework;

grafting a sorbent moiety to an organic linker of the metal organic framework by post synthetic modification wherein the post synthetic modification comprises forming a benzamide by reacting a carboxylic acid and an amine; and producing an adsorbent material for sensing applications from gas and liquid phase media.

8. A method of making an adsorbent material generating unique IR spectral features for sensing applications from gas and liquid phase media, comprising providing a metal organic framework;

grafting a sorbent moiety to a metal node of the metal organic framework via ligand displacement;

wherein the sorbent moiety is phenol based; and producing an adsorbent material generating unique IR spectral features for sensing applications from gas and liquid phase media.

9. The method of claim 8, wherein the sorbent moiety is a fluorinated phenol or bisphenol.

10. The method of claim 8, wherein the metal organic framework comprises UiO-66 or a derivative thereof.

11. The method of claim 8, wherein the metal organic framework comprises UiO-67, UiO-68, or any derivatives thereof.

12. A method of making an adsorbent material generating unique IR spectral features for sensing applications from gas and liquid phase media, comprising providing a metal organic framework;

intercalating a sorbent moiety into the pores of the metal organic framework;

wherein the sorbent moiety is phenol based; and producing an adsorbent material generating unique IR spectral features for sensing applications from gas and liquid phase media.

13. The method of claim 12, wherein the sorbent moiety is intercalated into the pores of the metal organic framework by diffusion after the metal organic framework is formed.

14. The method of claim 12, wherein the sorbent moiety is a fluorinated phenol or bisphenol.

15. The method of claim 12, wherein the metal organic framework comprises UiO-66 or a derivative thereof.

16. The method of claim 12, wherein the metal organic framework comprises UiO-67, UiO-68, or any derivatives thereof.

* * * * *